United States Patent [19]

Tanner et al.

[11] Patent Number: 4,971,288
[45] Date of Patent: Nov. 20, 1990

[54] VALVE ACTUATOR WITH HYDRAULIC DAMPER

[75] Inventors: Doug Tanner, Sartell; Greg Hegwer, Clear Lake; Al Backes, Cold Spring, all of Minn.

[73] Assignee: General Signal Corporation, Stamford, Conn.

[21] Appl. No.: 424,432

[22] Filed: Oct. 20, 1989

[51] Int. Cl.⁵ .............................. F16K 31/165
[52] U.S. Cl. ........................ 251/57; 251/58; 251/61
[58] Field of Search ................. 251/57, 58, 61

[56] References Cited

U.S. PATENT DOCUMENTS 2,320,886  6/1943  Quiroz ........................... 251/57 X
3,020,969  2/1962  Von Berg et al. ............... 251/57 X Primary Examiner—Arnold Rosenthal
Attorney, Agent, or Firm—Robert S. Smith; Ronald Reichman

[57] ABSTRACT

A valve actuator for an associated valve which includes apparatus for opening and closing an associated valve and a first housing in which a first diaphragm is disposed to define first and second chambers on respective sides of the first diaphragm. The apparatus also includes a valve actuator having a housing in which is disposed a second diaphragm to define a third chamber. The valve actuator includes apparatus connecting the second diaphragm to the apparatus for opening and closing the valve; and fluid coupling apparatus connecting the second chamber and the third chamber. The apparatus for opening and closing the valve includes a crank arm carried on a shaft.

16 Claims, 2 Drawing Sheets

VALVE ACTUATOR WITH HYDRAULIC DAMPER

BACKGROUND OF THE INVENTION

The invention relates to valves and particularly to fluid actuated and retarded valve actuators. While the invention has particular application to butterfly valves it will be understood that it also has application to other types of valves including but not limited to poppet, globe and other rotary valves. Any valve that opens with difficulty is potentially an application for the present invention. Pneumatic valve actuators are widely used for operating valves and pneumatic valve actuators are particularly desirable because compressed air is often readily available, the systems are relatively insensitive to leakage in that there is relatively little impact on the control system if there is a minor leak and the leak does not cause contamination of the ambient.

Despite these advantages, any problems are peculiar to pneumatic valve actuators. More specifically, in relatively large valves utilizing a crank arm in combination with a pneumatic actuator, the valve butterfly may set very firmly and thus a very large force may be required to initially unseat the valve. Thereafter, only a relatively small force is necessary to move the valve butterfly further away from its seat. Thus, a pneumatic actuator that produces the required initial force will continue to produce that substantial initial force even though far less force is required to open the valve even a slight additional amount. In part this is a function of the substantial compressibility of the air that is used to open and modulate the valve.

It will be seen that pneumatic actuators will tend to overshoot. That is, the valve will tend to open much wider than is desired. The valve will tend to require a large force to unseat the butterfly which will cause the valve to open much wider than is desired and the control system will not reduce the pneumatic pressure applied to a pneumatic actuator once the valve butterfly has moved away from its seat.

The prior art includes the following U.S. Pat. Nos.: 621,388; 741,732; 756,291; 964,735; 1.274,195; 1,672,366; 1,366,081; and 4,471,937.

U.S. Pat. No. 1,274,195 discloses a valve in which a mechanical linkage is provided to move a piston to cause oil to flow into a chamber which can then be used to force a valve to open in the manner of conventionally hydraulically operated valve.

The prior art also includes hydraulic car lifts such as those that are typically used in service stations. The apparatus includes a hydraulic cylinder which is coupled to an oil reservoir. In a typical construction air is pumped into the top of the oil reservoir to force the oil in the hydraulic reservoir into the cylinder to move a ram or piston and thus raise the automobile.

It is an object of the invention to provide apparatus which may be retrofitted on existing valves as well as be installed on new valves at the time of original manufacture.

It is another object of the invention to provide apparatus which is relatively inexpensive to manufacture and simple to install.

SUMMARY OF THE INVENTION

It has now been found that these and other objects of the invention may be attained in a valve actuator for an associated valve which includes means for opening and closing the associated valve, a first housing in which a first diaphragm or piston is disposed to define first and second chambers on respective sides of the first diaphragm or piston. A valve actuator has a housing in which is disposed a second diaphragm or piston to define a third chamber. The valve actuator includes means connecting the second diaphragm or piston to the means for opening and closing the valve; and fluid coupling means connecting the second chamber and the third chamber.

This embodiment of the apparatus in accordance with the invention may further include the means for opening and closing the valve includes a crank arm carried on a shaft. A hydraulic fluid may be disposed in the second and third chambers and the fluid coupling means joins the second and third chambers.

In other embodiments of the invention the first housing and the valve actuator are secured together by threaded fastening means. The threaded fastening means may comprise respective bolts and spacers. The valve actuator and first housing may be disposed in generally coaxial relationship.

BRIEF DESCRIPTION OF THE DRAWING

The invention will be better understood by reference to the accompanying drawing in which.

DESCRIPTION OF THE PREFERRED EMBODIMENT

Figure 1:
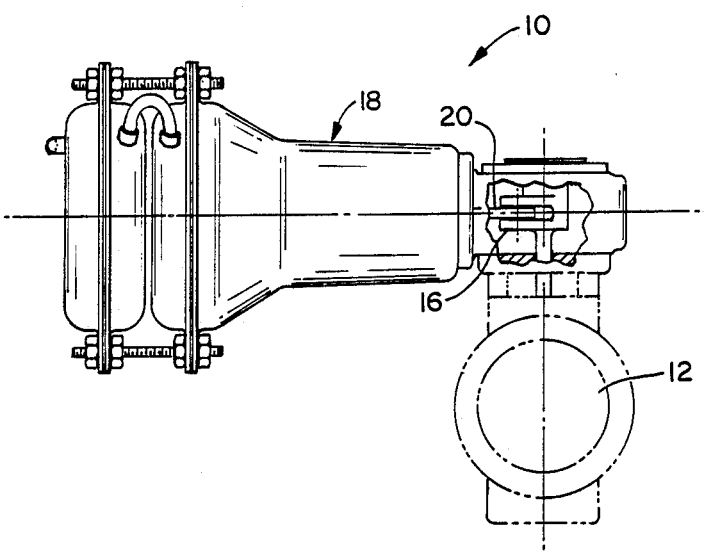
FIG. 1 is a side elevational view, partially broken away, of one form of the apparatus in accordance with the invention.
Figure 2:
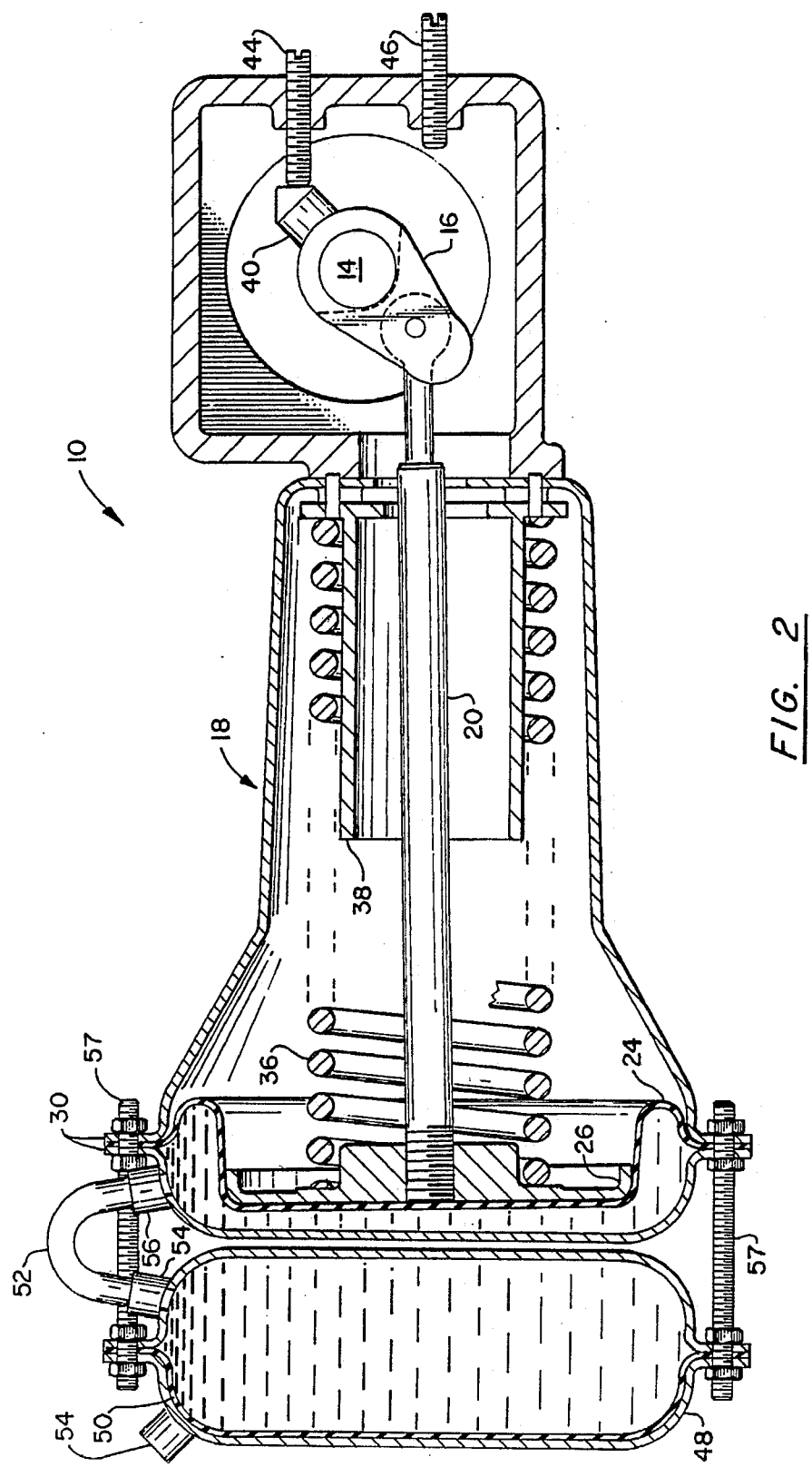
FIG. 2 is a plan view in section of the apparatus illustrated in FIG. 1 to a larger scale.

Referring now to FIGS. 1 and 2 there is shown valve 10 in accordance with one form of the invention includes a butterfly 12 that is secured to a shaft 14. The shaft 14 has a crank arm 16 mounted thereon coupled to an actuator 18 that includes a rod 20 mounted by a pin 22 to the crank arm 16. The rod 20 is coupled to the right side (as viewed) of a first diaphragm 24 by a plate 26. The diaphragm 24 disposed in sealing engagement to flanges 30, 30 which are part of the housing of the valve actuator. The valve actuator 18 includes a coil spring 36 rides on a spring guide 38 at the right (as viewed) extremity thereof and on the plate 26 at the left (as viewed) extremity thereof.

It will thus be seen that in the absence of pressure on the first diaphragm 24 spring guide 38 will cause the rod 20 to move to the left (as viewed) position as shown in FIG. 2 causing the member to rotate till the stop 40 rests against the first stop member 44 as shown. When fluid pressure is applied to the left (as viewed) face of the first diaphragm 24 the force of the spring 36 bearing on the spring guide 38 is overcome to cause the rod 20 to move to the right (as shown) to thereby rotate the crank arm 16 so as to cause the valve and particularly the butterfly 12 to move from the closed position toward the full open position. A second stop member 46 is provided to limit travel of the crank arm member.

The apparatus in accordance with the invention also includes a second housing 48 which has two sections which are secured together with a second diaphragm 50 therebetween. The right side (as viewed) of the second diaphragm 50 is disposed in fluid communication with the left side (as viewed) of the first diaphragm 24 means of a tube 52 having fittings 56, 54 coupling respectively to the valve actuator 18 and the second housing 48. A fitting 54 is provided for attachment of an air supply (not shown to the left side of the second diaphragm 50.

The second housing 48 is connected to the actuator 18 by means of rods 57, 57. In the preferred embodiment respective nuts 58, 58, 58, 58 secure the two portions of the second housing 48 together as well as providing clamping for the respective first and second diaphragms 24, 50.

A hydraulic fluid is disposed on the left side (as viewed) of the first diaphragm 24 in the valve actuator 18, within the tube 52 and between the right side of the second diaphragm 50 and the housing 48. Thus, it will be seen that application of pneumatic pressure to the left side of the second diaphragm 50 forces hydraulic fluid against the left side as viewed of the first diaphragm 24 to cause the butterfly 12 to rotate toward the open position.

It will be seen that the hydraulic fluid provides a damping effect so that the operation of the valve is much better controlled. More specifically, in the prior art apparatus which is solely pneumatic, a very large pressure such as 15 pounds per square inch may be required to cause the butterfly to unseat. This 15 pound per square inch pressure will cause the valve to go fully open, or at least approach a fully open position as soon as the valve unseats. For many applications, this is not acceptable and in fact only a slight opening of the valve may be desired. For example, it may be desired to only rotate the butterfly 5 degrees away from the fully open position.

In contrast, in the apparatus in accordance with the invention, the initial opening of the butterfly will cause a rapid decrease in the pressure of the hydraulic fluid on the left (as viewed) face of the first diaphragm 24. This occurs because the hydraulic fluid is substantially incompressible unlike compressed air which has been used in conventional pneumatically operated valves. It will be understood that in conventional pneumatically operated valves, the compressed air is very compressible and will merely expand as an attempt is made to reduce the pressure on a valve diaphragm. Thus, the pressure may substantially maintain the same pressure on the first diaphragm 24 and thus cause the valve actuator 18 to force the valve butterfly 12 essentially fully open. In the present apparatus the pressure on the first diaphragm 24 drops more rapidly because the flow of hydraulic fluid into the valve actuator 18 from the housing 50 is restricted so that the pressure which is maintained against the first diaphragm 24 is minimized because of the fluid restriction of the tube 52 and the incompressibility of the hydraulic fluid. Accordingly, the butterfly 24 will open smoothly with a minimum of overshoot. The hydraulic pressure in both the housing 48 and the valve actuator 18 will of course stabilize after a brief time interval.

Those skilled in the art will recognize that (1) the diaphragm described in the preferred embodiment may be replaced with a cylinder and piston arrangement or (2) the hydraulic fluid may be disposed in the housing 48 on the left side of the diaphragm and the air pressure may be applied to the right side of the second diaphragm 50 without departing from the spirit of the invention. Similarly, in other embodiments of the invention the valve may be a normally open valve instead of a normally closed valve.

The invention has been described with reference to its illustrated preferred embodiment. Persons skilled in the art of such devices may upon exposure to the teachings herein, conceive other variations. Such variations are deemed to be encompassed by the disclosure, the invention being delimited only by the appended claims.

Having thus described my invention we claim:

1. A valve actuator for an associated valve which comprises:
   means for opening and closing the associated valve, said means for opening and closing said valve including a crank arm carried on a shaft;
   a first housing in which a first movable means is disposed to define first and second chambers on respective sides of said first means;
   a valve actuator having a housing in which is disposed a second movable means to define a third chamber;
   said valve actuator including means connecting said second means to said means for opening and closing said valve;
   fluid coupling means connecting said second chamber and said third chamber;
   a hydraulic fluid is disposed in said second and third chambers and
   said fluid coupling means joins said second and third chambers; and
   means for connecting a pneumatic control to said first housing to supply air pressure to said first housing to supply air pressure to said first chamber.

2. The apparatus as described in claim 1 wherein:
   said first housing and said valve actuator are secured together by threaded fastening means.

3. The apparatus as described in claim 2 wherein:
   said threaded fastening means comprises respective bolts and spacers.

4. The apparatus as described in claim 3 wherein:
   said valve actuator and first housing are disposed in generally coaxial relationship.

5. A valve actuator for an associated valve which comprises:
   means for opening and closing the associated valve, said means for opening and closing said valve including a crank arm;
   a first housing in which a first diaphragm is disposed to define first and second chambers on respective sides of said first diaphragm;
   a valve actuator having a housing in which is disposed a second diaphragm to define a third chamber;
   said valve actuator including means connecting said second diaphragm to said means for opening and closing said valve; and fluid coupling means connecting said second chamber and said third chamber;
   a hydraulic fluid is disposed in said second and third chambers and said fluid coupling means joins said second and third chambers.
   means for connecting a pneumatic control to said first housing to supply air pressure to said first said first chamber.

6. The apparatus as described in claim 5 wherein:
   said first housing and said valve actuator are secured together by threaded fastening means.

7. The apparatus as described in claim 6 wherein:
   said threaded fastening means comprises respective bolts and spacers.

8. The apparatus as described in claim 7 wherein:
   said valve actuator and first housing are disposed in generally coaxial relationship.

9. A valve actuator for an associated valve which comprises:
- means for opening and closing the associated valve, said means for opening and closing said valve including a crank arm carried on a shaft;
- a first housing in which a first diaphragm is disposed to define first and second chambers on respective sides of said first diaphragm;
- a valve actuator having a housing in which is disposed a second diaphragm to define a third chamber;
- said valve actuator including means connecting said second diaphragm to said means for opening and closing said valve; and fluid coupling means connecting said second chamber and said third chamber;
- a hydraulic fluid is disposed in said second and third chambers and said fluid coupling means joins said second and third chambers, and
- means for connecting a pneumatic control to said first housing to supply air pressure to said first said first chamber.

10. The apparatus as described in claim 9 wherein:
said first housing and said valve actuator are secured together by threaded fastening means.

11. The apparatus as described in claim 10 wherein:
said threaded fastening means comprises respective bolts and spacers.

12. The apparatus as described in claim 11 wherein:
said valve actuator and first housing are disposed in generally coaxial relationship.

13. A valve actuator for an associated valve which comprises:
- means for opening and closing the associated valve, said means for opening and closing said valve including a crank arm carried on a shaft;
- a first housing in which a first diaphragm is disposed to define first and second chambers on respective sides of said first diaphragm;
- a valve actuator having a housing in which is disposed a second diaphragm to define a third chamber;
- said valve actuator including means connecting said second diaphragm to said means for opening and closing said valve; and fluid coupling means connecting said second chamber and said third chamber;
- a hydraulic fluid is disposed in said second and third chambers and said fluid coupling means joins said second and third chambers.
- a pneumatic control pressure connected to said first housing to supply air pressure to said first chamber.

14. The apparatus as described in claim 13 wherein:
said first housing and said valve actuator are secured together by threaded fastening means.

15. The apparatus as described in claim 14 wherein:
said threaded fastening means comprises respective bolts and spacers.

16. The apparatus as described in claim 13 wherein:
said valve actuator and first housing are disposed in generally coaxial relationship.

* * * * *